US012701355B2

(12) United States Patent
Chakrabarty et al.

(10) Patent No.: US 12,701,355 B2
(45) Date of Patent: Aug. 4, 2026

(54) APPARATUS AND METHOD FOR NARROWBAND DIRECTION- OF-ARRIVAL ESTIMATION

(71) Applicant: Fraunhofer-Gesellschaft zur Förderung der angewandten Forschung e.V., Munich (DE)

(72) Inventors: Soumitro Chakrabarty, Erlangen (DE); Shashi Kumar Kempapura Srinivasa, Erlangen (DE); Fabian Küch, Erlangen (DE); Christian Kroos, Erlangen (DE); Oliver Thiergart, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 87 days.

(21) Appl. No.: 18/600,897

(22) Filed: Mar. 11, 2024

(65) Prior Publication Data

US 2024/0214729 A1 Jun. 27, 2024

Related U.S. Application Data

(63) Continuation of application No. PCT/EP2022/075532, filed on Sep. 14, 2022.

(30) Foreign Application Priority Data

Sep. 16, 2021 (EP) .................................... 21197245

(51) Int. Cl.

| | |
|---|---|
| ***H04R 3/00*** | (2006.01) |
| ***H04R 5/027*** | (2006.01) |
| ***H04S 7/00*** | (2006.01) |

(52) U.S. Cl.

CPC ............. *H04R 3/005* (2013.01); *H04R 5/027* (2013.01); *H04S 7/30* (2013.01); *H04S 2400/15* (2013.01); *H04S 2420/07* (2013.01)

(58) Field of Classification Search

CPC ........ H04R 3/005; H04R 5/027; H04R 1/406; H04S 7/30; H04S 2400/15;

(Continued)

(56) References Cited

U.S. PATENT DOCUMENTS

2009/0238370 A1 9/2009 Rumsey
2009/0296526 A1 12/2009 Amada (Continued)

OTHER PUBLICATIONS

Gupta et al. (Parametric Hear through Equalization for Augmented Reality Audio, IEEE Apr. 17, 2019) https://ieeexplore.ieee.org/document/8683657 (Year: 2019).*

(Continued)

*Primary Examiner* — Yogeshkumar Patel
(74) *Attorney, Agent, or Firm* — McClure, Qualey & Rodack, LLP

(57) ABSTRACT

An apparatus for estimating sub-band-specific direction information for two or more sub-bands of a plurality of sub-bands according to an embodiment is provided. The apparatus has a feature extractor for obtaining a plurality of feature samples for a plurality of frequency bands of two or more audio signals. Moreover, the apparatus has a direction estimator being configured to receive the plurality of feature samples as input values and being configured to output a plurality of output samples wherein the output samples indicate, for each sub-band of the two or more sub-bands, the sub-band-specific direction information for said sub-band. Each of the plurality of sub-bands is equal to one of the plurality of frequency bands or has at least one frequency band or a portion of a frequency band of the plurality of frequency bands.

18 Claims, 5 Drawing Sheets

(58) Field of Classification Search

CPC ..... H04S 2420/07; G10L 25/03; G10L 25/18; G10L 25/30; G10L 25/81; G01S 3/801; G01S 3/8083; G06N 20/00; G06N 3/045; G06N 3/088

See application file for complete search history.

(56) References Cited

U.S. PATENT DOCUMENTS

| | | | | |
|---|---|---|---|---|
| 2013/0166286 | A1 | 6/2013 | Matsumoto | |
| 2013/0272097 | A1 | 10/2013 | Kim | |
| 2018/0182402 | A1 | 6/2018 | Krueger | |
| 2021/0074316 | A1* | 3/2021 | Souden | G10L 25/18 |

OTHER PUBLICATIONS

Theigart et al. (A low complexity weighted least squares narrowband DOA estimator for arbitrary array geometries, IEEE May 19, 2016) https://ieeexplore.ieee.org/document/7471693 (Year: 2016).*

Yao et al. (Wideband DOA Estimation Based on Deep Residual Learning With Lyapunov Stability Analysis, IEEE Jul. 15, 2021) https://ieeexplore.ieee.org/document/9486875 (Year: 2021).*

Ma et al. (Exploiting Deep Neural Networks and Head Movements for Robust Binaural Localization of Multiple Sources in Reverberant Environments, IEEE Oct. 27, 2017) https://ieeexplore.ieee.org/document/8086216 (Year: 2017).*

International Search Report and Written Opinion dated Nov. 30, 2022, issued in application No. PCT/EP2022/075532.

Gupta, R., et al.; "Parametric Hear through Equalization for Augmented Reality Audio;" IEEE International Conference on Acoustics, Speech and Signal Processing (ICASSP), IEEE; 2019; pp. 1587-1591.

Ning, M., et al.; "Exploiting Deep Neural Networks and Head Movements for Robust Binaural Localisation of Multiple Sources in Reverberant Environments;" IEEE/ACM Transactions on Audio, Speech and Language Processing; Apr. 2019; pp. 1-10.

Thiergart, O., et al.; "A low complexity weighted least squares narrowband DOA estimator for arbitrary array geometries", 2016 IEEE International Conference on Acoustics, Speech and Signal Processing (ICASSP); 2016; pp. 340-344.

Yao, Y., et al.; "Wideband DOA Estimation Based on Deep Residual Learning With Lyapunov Stability Analysis;" IEEE Geoscience and Remote Sensing Letters; vol. 29; 2022; pp. 1-5.

Firoozabadi, A.D., et al.l; "Subband processing-based approach for the localisation of two simultaneous speakers;" IET Signal Processing, The Institution of Engineering and Technology; vol. 8; No. 9; 2014; pp. 996-1008.

Reddy, V.V., et al.; "Unambiguous speech DOA estimation under spatial aliasing conditions;" IEEE/ACM Transactions on Audio, Speech, and Language Processing, IEEE; Dec. 2014; pp. 2133-2145.

Chen, J., et al.; "Time Delay Estimation in Room Acoustic Environments: An Overview;" EURASIP Journal on Advances in Signal Processing; 2006; pp. 1-19.

Reddy, V.V., et al.; "Unambiguous Speech DOA Estimation Under Spatial Aliasing Conditions;" IEEE/ACM Transactions on Audio, Speech, and Language Processing; vol. 22; No. 12; Dec. 2014; pp. 2133-2145.

Dibiase, J.H., et al.; "Robust Localization in Reverberant Rooms;" Microphone Arrays; 2001; pp. 1-24.

Chakrabarty, S., et al.; "Multi-Speaker DOA Estimation Using Deep Convolutional Networks Trained With Noise Signal;" IEEE Journal of Selected Topics in Signal Processing, vol. 13, No. 1; Mar. 2019; pp. 8-21.

Moore, B.C.J., et al.; "Suggested formulae for calculating auditory-filter bandwidths and excitation patterns;" Journal of the Acoustical Society of America 74; Apr. 1983; pp. 750-753.

Zwicker, E.; "Subdivision of the audible frequency range into critical bands;" The Journal of the Acoustical Society of America, vol. 33, Issue 2; Feb. 1961; pp. 248.

* cited by examiner

APPARATUS AND METHOD FOR NARROWBAND DIRECTION- OF-ARRIVAL ESTIMATION

CROSS-REFERENCE TO RELATED APPLICATIONS

This application is a continuation of copending International Application No. PCT/EP2022/075532, filed Sep. 14, 2022, which is incorporated herein by reference in its entirety, and additionally claims priority from European Application No. 21197245.0, filed Sep. 16, 2021, which is also incorporated herein by reference in its entirety.

TECHNICAL FIELD

The present invention relates to processing of audio signals and, in particular, to an apparatus and a method for narrowband direction-of-arrival estimation.

BACKGROUND OF THE INVENTION

The availability of multiple microphones for the acquisition of a sound scene affords the ability to incorporate and utilize spatial information about the acoustic environment for audio signal processing tasks such as beamforming, noise reduction, interference suppression, voice quality enhancement, speaker extraction etc.

An important parameter of interest for these tasks is the direction-of-arrival (DOA) of the sound wave originating from the spatial position of a sound source. This parameter is generally utilized as information about a specific sound source of interest, information about undesired sound sources and relative positioning of sound sources within a sound scene.

In several application scenarios of spatial audio processing with microphone arrays, the estimation of the direction-of-arrival of sound within small frequency sub-bands is required.

The DOA parameter is generally unknown and needs to be estimated using multi-channel audio signal processing methods (for example, multi-microphone signal processing methods. There are two broad paradigms of DOA estimation methods: Broadband and narrowband DOA estimation (see [1]).

In broadband estimation, an estimate of the DOA parameter is obtained from the acquired audio signal at each time instant or over a certain time period.

In narrowband DOA estimation, a distinct DOA estimate is obtained for each frequency sub-band component of the acquired audio signal at each time instant or over a certain time period.

Existing methods for narrowband DOA estimation first compute a frequency-domain representation of the audio signal acquired by the microphone arrays. Then, for each frequency bin in the frequency-domain representation of the signals, DOA estimate(s) are obtained by exploiting mainly the information across different elements in the microphone array. Examples of popular methods for narrowband DOA estimation methods for audio signals are steered response power (SRP), multiple signal classification (MUSIC), weighted least-squares (WLS) estimator (see [1], [2], [3]), etc.

A major limitation of the existing methods is the problem of spatial aliasing (see [1]), which leads to ambiguous DOA estimates for frequency bins that lie above the critical spatial aliasing frequency, which is determined based on the smallest distance between two elements of the microphone array. In case the microphone spacing is too large, the DOA estimation for higher frequencies is not possible with classical methods due to spatial aliasing effects. Physical constraints for microphone array design and the generally wide frequency range of audio signal makes this a common and relevant issue.

SUMMARY

According to an embodiment, an apparatus for estimating sub-band-specific direction information for two or more sub-bands of a plurality of sub-bands may have: a feature extractor for obtaining a plurality of feature samples for a plurality of frequency bands of two or more audio signals, and a direction estimator being configured to receive the plurality of feature samples and being configured to output a plurality of output samples wherein the output samples indicate, for each sub-band of the two or more sub-bands, the sub-band-specific direction information for said sub-band, wherein each of the plurality of sub-bands is equal to one of the plurality of frequency bands or has at least one frequency band or a portion of a frequency band of the plurality of frequency bands.

According to another embodiment, a method for estimating sub-band-specific direction information for two or more sub-bands of a plurality of sub-bands may have the steps of: obtaining a plurality of feature samples for a plurality of frequency bands of two or more audio signals, and receiving the plurality of feature samples and being configured to output a plurality of output samples wherein the output samples indicate, for each sub-band of the two or more sub-bands, the sub-band-specific direction information for said sub-band, wherein each of the plurality of sub-bands is equal to one of the plurality of frequency bands or has at least one frequency band or a portion of a frequency band of the plurality of frequency bands.

Another embodiment may have a non-transitory digital storage medium having stored thereon a computer program for performing a method for estimating sub-band-specific direction information for two or more sub-bands of a plurality of sub-bands, the method having the steps of: obtaining a plurality of feature samples for a plurality of frequency bands of two or more audio signals, and receiving the plurality of feature samples and being configured to output a plurality of output samples wherein the output samples indicate, for each sub-band of the two or more sub-bands, the sub-band-specific direction information for said sub-band, wherein each of the plurality of sub-bands is equal to one of the plurality of frequency bands or has at least one frequency band or a portion of a frequency band of the plurality of frequency bands, when the computer program is run by a computer.

An apparatus for estimating sub-band-specific direction information for two or more sub-bands of a plurality of sub-bands according to an embodiment is provided. The apparatus comprises a feature extractor for obtaining a plurality of feature samples for a plurality of frequency bands of two or more audio signals. Moreover, the apparatus comprises a direction estimator being configured to receive the plurality of feature samples and being configured to output a plurality of output samples wherein the output samples indicate, for each sub-band of the two or more sub-bands, the sub-band-specific direction information for said sub-band. Each of the plurality of sub-bands is equal to one of the plurality of frequency bands or comprises at least one frequency band or a portion of a frequency band of the plurality of frequency bands.

Moreover, for estimating sub-band-specific direction information for two or more sub-bands of a plurality of sub-bands. The method comprises:

Obtaining a plurality of feature samples for a plurality of frequency bands of two or more audio signals. And:

Receiving the plurality of feature samples and being configured to output a plurality of output samples wherein the output samples indicate, for each sub-band of the two or more sub-bands, the sub-band-specific direction information for said sub-band.

Each of the plurality of sub-bands is equal to one of the plurality of frequency bands or comprises at least one frequency band or a portion of a frequency band of the plurality of frequency bands.

Furthermore, a computer program for implementing the above-described method when being executed on a computer or signal processor is provided.

BRIEF DESCRIPTION OF THE DRAWINGS

In the following, embodiments of the present invention are described in more detail with reference to the figures, in which.

DETAILED DESCRIPTION OF THE INVENTION

Figure 1:
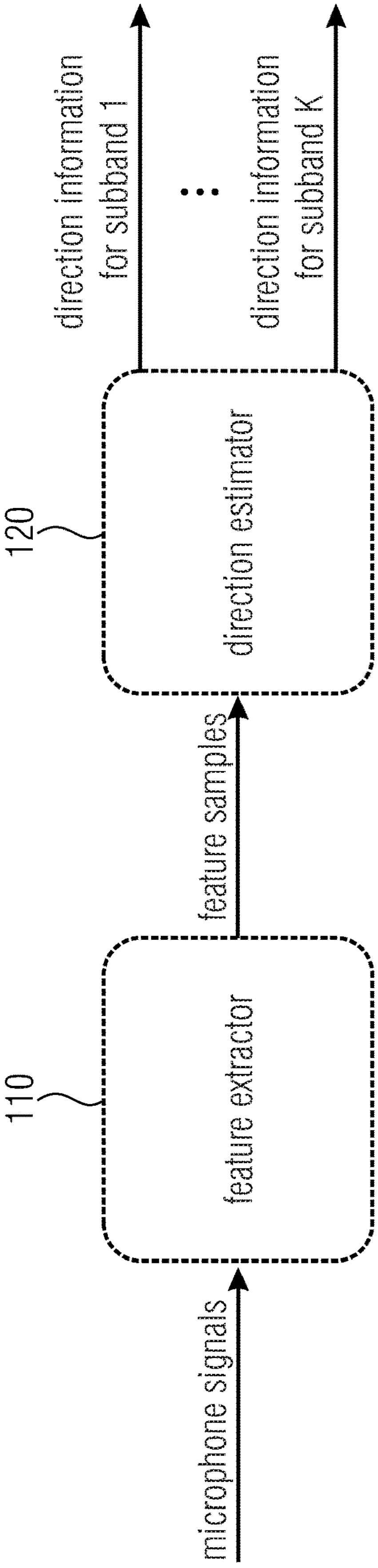
FIG. 1 illustrates an apparatus for estimating sub-band-specific direction information for two or more sub-bands of a plurality of sub-bands according to an embodiment.

FIG. 1 illustrates an apparatus for estimating sub-band-specific direction information for two or more sub-bands of a plurality of sub-bands according to an embodiment.

The apparatus comprises a feature extractor 110 for obtaining a plurality of feature samples for a plurality of frequency bands of two or more audio signals.

Moreover, the apparatus comprises a direction estimator 120 being configured to receive the plurality of feature samples and being configured to output a plurality of output samples wherein the output samples indicate, for each sub-band of the two or more sub-bands, the sub-band-specific direction information for said sub-band.

Each of the plurality of sub-bands is equal to one of the plurality of frequency bands or comprises at least one frequency band or a portion of a frequency band of the plurality of frequency bands.

In an embodiment, the direction estimator 120 may, e.g., be configured to employ a machine learning concept (or, e.g., an artificial intelligence concept) to determine, using the plurality of features samples, the plurality of output samples which indicate the sub-band-specific direction information for the two or more sub-bands.

Figure 2:
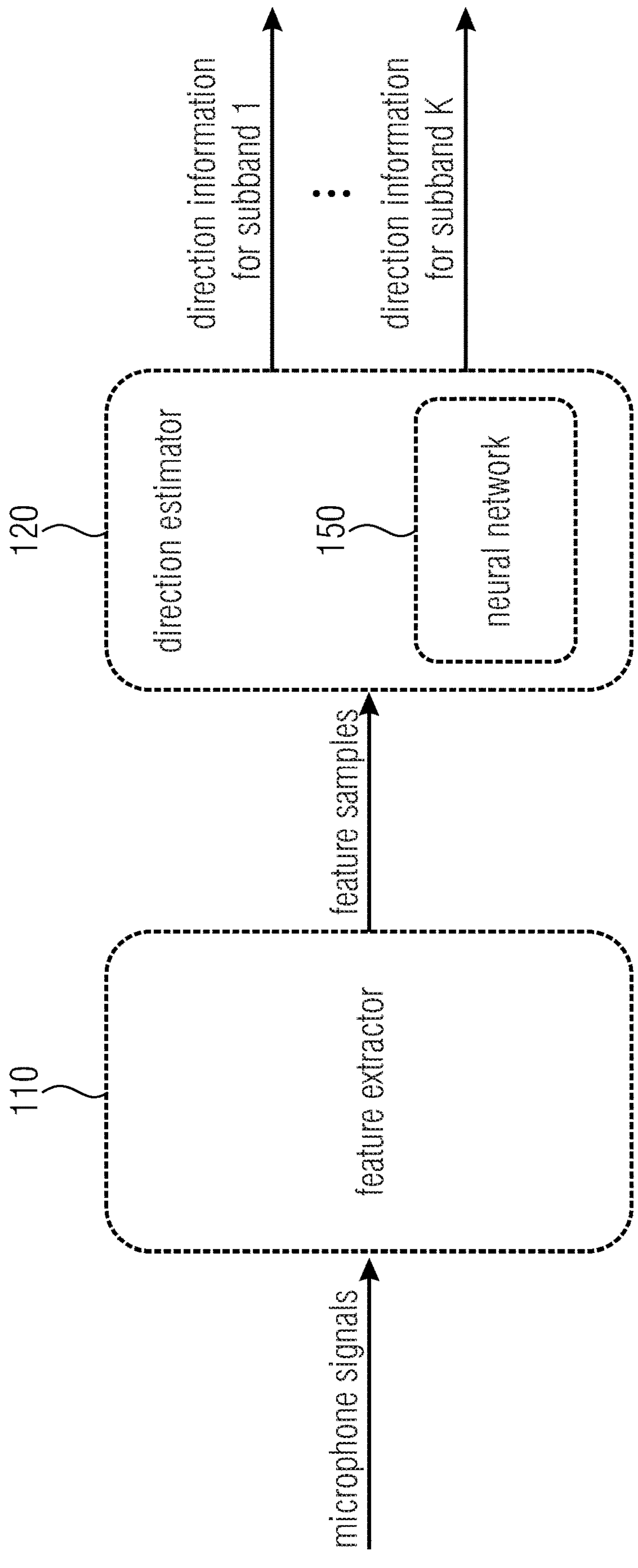
FIG. 2 illustrates an apparatus for estimating sub-band-specific direction information according to another embodiment, wherein the direction estimator comprises a neural network.

FIG. 2 illustrates an apparatus for estimating sub-band-specific direction information according to another embodiment, wherein the direction estimator 120 comprises a neural network 150. The neural network 150 may, e.g., be configured to receive as input values the plurality of feature samples. Moreover, the neural network 150 configured to output the plurality of output samples which indicate, for each sub-band of the two or more sub-bands, the sub-band-specific direction information for said sub-band.

Thus, such an embodiment e.g., employs a neural network 150 as the machine learning concept.

In other embodiments, another machine learning concept may, e.g., be employed, for example, a support vector machine, or, for example, a machine learning concept that employs a decision tree.

Some embodiments are based on the finding that a spatial aliasing effect in DOA estimation for particular sub-bands can be removed or at least reduced, if information from other frequency bands or other sub-bands is taken into account. Moreover, some embodiments are based on the finding that employing a machine learning concept, for example, a neural network for the purpose of estimating sub-band specific direction information, e.g., DOA information achieves that by employing (e.g., fully) connected layers information, e.g., feature samples, from the other frequency bands or from the other sub-bands is most suitably been taken into account, as employing a neural network realizes that all relevant information is in a suitable way taken into account. For example, this ensures that information of the audio signals (for example, microphone signals) at lower frequencies is used for the higher frequency bands to provide robust direction estimation, e.g., DOA estimation.

According to an embodiment, the direction estimator 120 may, e.g., be configured to determine the sub-band-specific direction information for said sub-band depending on one or more of the plurality of feature samples, which are associated with said sub-band, and depending on one or more further feature samples of the plurality of feature samples, which are associated with one or more other sub-bands of the plurality of sub-bands.

In an embodiment, the direction estimator 120 may, e.g., be configured to determine the sub-band-specific direction information for each sub-band of the two or more sub-bands depending on at least one of the plurality of feature samples of each of the plurality of frequency bands of each of the two or more audio signals. In other words, the sub-band specific direction information for each sub-band may, e.g., be determined depending on at least one feature sample of each of the audio signals for each of the plurality of frequency bands, for which the direction estimator 120 receives feature samples. Thus, information from all of the two or more audio signals and from all frequency bands is taken into account to determine the sub-band specific direction information for a particular sub-band.

According to an embodiment, the direction of arrival information for said sub-band may, e.g., depend on a location of a real sound source.

Or, in another embodiment, the direction of arrival information for said sub-band may, e.g., depend on a location of a virtual sound source. For example, the two or more audio signals may, e.g., be artificially generated such that the one or more signal components of the two or more audio signals appear to originate from one or more (virtual) sound sources.

According to an embodiment, the sub-band-specific direction information for each sub-band of the two or more sub-bands may, e.g., be direction-of-arrival information for said sub-band or depends on direction-of-arrival information for said sub-band.

In an embodiment, the plurality of feature samples for the plurality of frequency bands may, e.g., comprise a plurality of phase values and/or a plurality of amplitude or magnitude values of the two or more audio signals for the plurality of frequency bands. And/or the plurality of feature samples for the plurality of frequency bands may, e.g., comprise a concatenation of a plurality of amplitude or magnitude values and of a plurality of phase values of the two or more audio signals for the plurality of frequency bands.

According to an embodiment, the feature extractor 110 may, e.g., be configured to obtain the plurality of feature samples for the plurality of frequency bands of two or more audio signals by transforming the two or more audio signals from a time domain to a frequency domain.

In an embodiment, the direction estimator 120 may, e.g., be configured to determine the sub-band-specific direction information for each sub-band of the two or more sub-bands by employing at least one fully connected layer 170 of the neural network 150 that connects at least one of the plurality of feature samples of each of the plurality of frequency bands of each of the two or more audio signals with each other. In other words, at least one feature sample of each of the two or more audio signals of each of the frequency bands, for which feature samples are provided, are connected with each other by the fully connected layer. By this, information from all of the plurality of frequency bands is taken into account.

According to an embodiment, the direction estimator 120 may, e.g., be configured to determine the sub-band-specific direction information for each sub-band of the two or more sub-bands by employing one or more convolution layers 160 of the neural network 150 that connect feature samples of the plurality of feature samples that are associated with different audio signals of the two or more audio signals.

In an embodiment, the neural network 150 may, e.g., comprise a sub-band segmentation layer 180 that provides as output of the sub-band segmentation layer 180 one or more output values for each of the two or more sub-bands, wherein the input values of the sub-band segmentation layer 180 depend on the plurality of feature samples for the plurality of frequency bands of two or more audio signals.

According to an embodiment, a segmentation of the frequency spectrum into the plurality of sub-bands may, e.g., depend on a psychoacoustic scale.

In an embodiment, a number of the plurality of frequency bands, which represents a first segmentation of a frequency spectrum, may, e.g., be smaller than a number of the plurality of sub-bands, which represents a second segmentation of the frequency spectrum.

According to an embodiment, a number of the plurality of sub-bands, which represents a second segmentation of a frequency spectrum, may, e.g., be smaller than a number of the plurality of frequency bands, which represents a first segmentation of the frequency spectrum.

For example, computed feature vectors may, e.g., be segmented into sub-bands where the number of sub-bands is less than or equal to the number of frequency bins in the frequency domain feature representation.

And/or, for example, sub-band feature embedding vectors may, e.g., be computed using a non-linear combination of the frequency domain embeddings across all frequencies and performing a subsequent sub-band segmentation. The number of sub-band vectors may, e.g., typically be smaller than the number of frequency bins.

And/or, for example, an operation of sub-band segmentation may, e.g., performed on the output of a processing module FCB1 170. The sub-band segmentation may, e.g., be performed based on some empirically determined task-specific scale or existing psychoacoustic scales such as equivalent rectangular bandwidth (ERB) [6] or Bark scale. The output of the segmentation module 180 may, e.g., be a set of K sub-band feature embedding vectors, where K is typically smaller or equal to the number of frequency bins, e.g., the number of elements of the frequency domain feature embeddings at the output of FCB1.

According to an embodiment, the neural network 150 may, e.g., comprise two or more sub-band estimation blocks 191, 192, 193, 19K configured for estimating the sub-band-specific direction information for the two or more sub-bands. For each sub-band of the two or more sub-bands, a sub-band estimation block of the two or more sub-band estimation blocks 191, 192, 193, 19K may, e.g., be configured to estimate the sub-band-specific direction information for said sub-band depending on two or more output values of the sub-band segmentation layer 180 for said sub-band.

In an embodiment, for each sub-band of the two or more sub-bands, said sub-band estimation block of the two or more sub-band estimation blocks 191, 192, 193, 19K may, e.g., be configured to estimate the sub-band-specific direction information for said sub-band by conducting a non-linear combination of the two or more output values of the sub-band segmentation layer 180 for said sub-band according to a non-linear combination rule for said sub-band. The non-linear combination rules for at least two of the two or more sub-bands may, for example, be different from each other.

According to an embodiment, the two or more audio signals may, e.g., be two or more microphone signals (e.g., recorded by two or more microphones) or are derived from the two or more microphone signals.

In another embodiment, the two or more audio signals may, e.g., be artificially generated.

Embodiments relate to processing of audio signals acquired by an array of microphones. It is specifically related to estimating the direction-of-arrival (DOA) parameter for each frequency sub-band of audio signals acquired by multiple microphones.

The focus of this invention is on narrowband DOA estimation.

Some embodiments provide concepts to obtain a DOA estimation in narrow frequency bands also above the spatial aliasing frequency of the microphone arrays.

In some embodiments, convolutive neural networks and different stages of fully connected layers are combined to an overall deep neural network that is able to make use of information of the audio signals (for example, microphone signals) at lower frequencies to provide robust DOA estimation for the higher frequency bands.

An embodiment provides a narrowband DOA estimation method with a mechanism built into the design of the method that alleviates this problem.

Embodiments of the present invention relate to a method for narrowband DOA estimation that acts as a functional mapping from the acquired audio signals to distinct DOA estimates for each sub-band component of the acquired audio signal.

Figure 3:
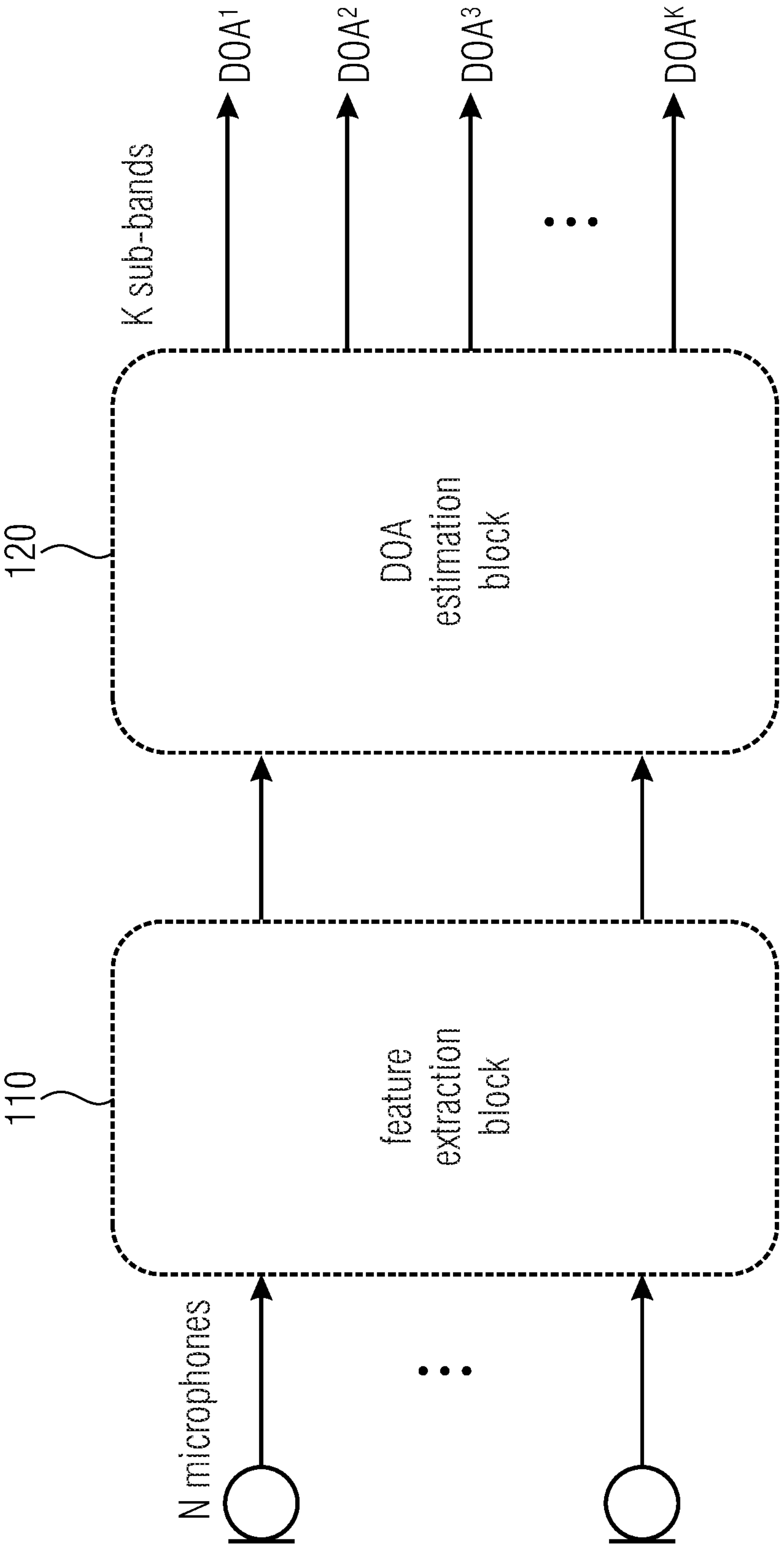
FIG. 3 an apparatus for estimating sub-band-specific direction-of-arrival information as the direction information for two or more sub-bands of a plurality of sub-bands according to another embodiment.

FIG. 3 an apparatus for estimating sub-band-specific direction-of-arrival information as the direction information for two or more sub-bands of a plurality of sub-bands according to another embodiment.

In FIG. 3, the first block is a feature extractor 110 that transforms the N input audio signals into the frequency domain and computes the corresponding frequency domain feature vectors for a specified embodiment/for a particular application.

The second block is the direction estimator 120, e.g., a narrowband DOA estimation block 120, that takes the computed frequency domain feature vector as the input and computes the DOA for K different frequency sub-band components of the audio signal. In FIG. 3, the DOA estimation block 120 is an artificial neural network designed to combine information from multiple frequency bins to alleviate the issue of spatial aliasing generally found in typical narrowband DOA estimators.

In an embodiment of the invention, the feature extractor block 110 computes the time-frequency transform of the audio signals from which the phase component is explicitly computed and extracted to form the feature representation that is provided as an input to the DOA estimation block 120.

The use of the phase component in this embodiment is based on the finding that the information relevant to DOA estimation, e.g., the time delay between the microphone elements, is contained in the phase component.

In another embodiment, only the magnitude component of the time-frequency representation of the signal can also be used as an input to the DOA estimation block 120. This is particularly relevant for microphone arrays with directional microphones with different look directions, devices where the shadowing effect on the microphones due to the device itself is prominent as well as arrays where the microphones are placed far apart from each other.

Another embodiment uses a feature extractor block 110 that computes the feature representation by concatenating the magnitude and phase components for each frequency bin of the frequency-domain representation of the audio signals.

Figure 4:
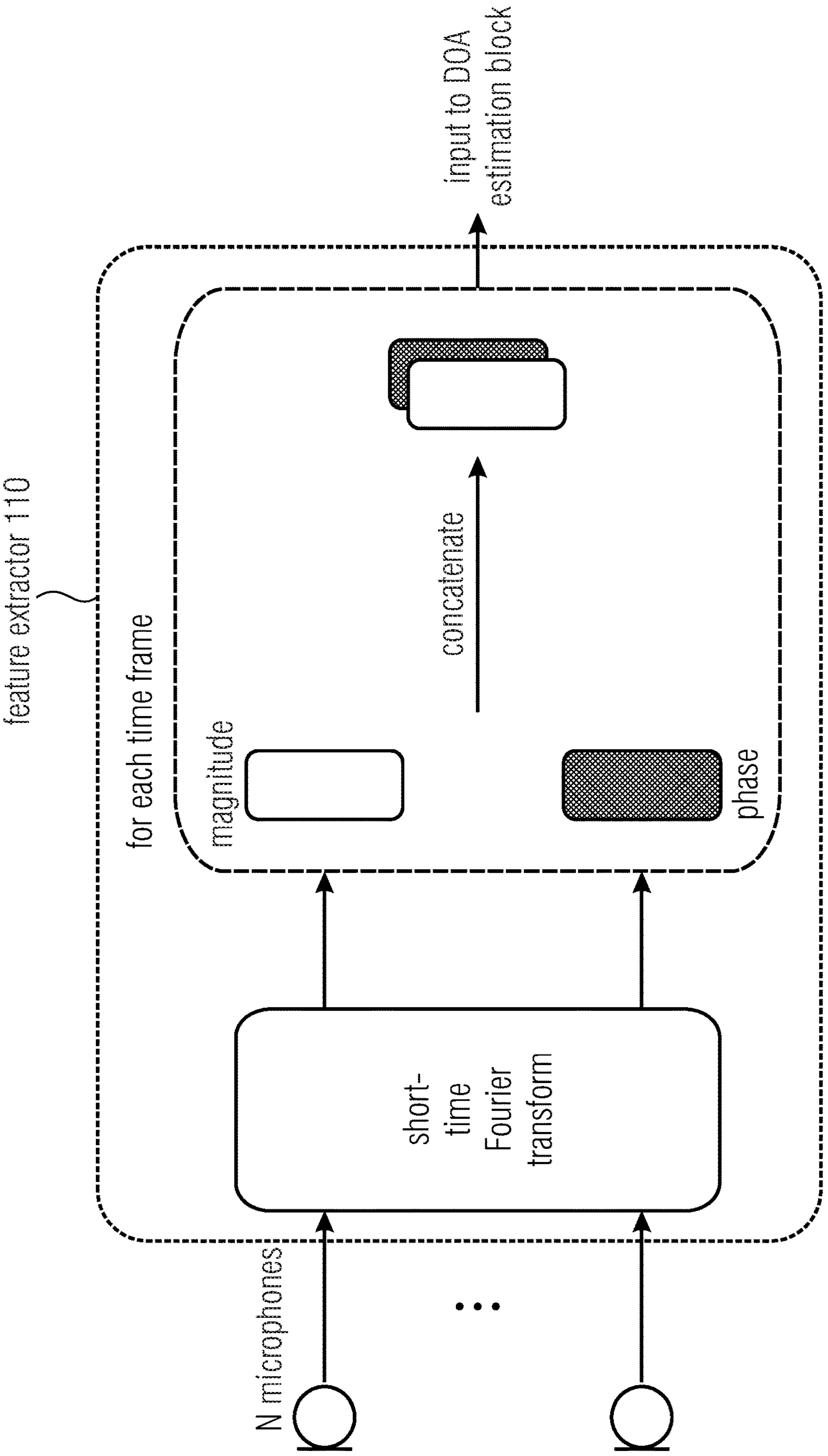
FIG. 4 illustrates a feature extractor according to an embodiment.

FIG. 4 illustrates a feature extractor 110 according to an embodiment.

The configuration of the feature extractor 110 of FIG. 4 is based on the finding that for microphones mounted in closed enclosures the relative magnitude difference between the microphone elements can also aid in DOA estimation. The computed frequency domain feature representation is provided as input to the DOA estimation block 120.

As an alternative to the magnitude and the phase components, a different representation of the same information such as the real and imaginary components of the time-frequency representation of the signal can also be provided as input to the DOA estimation block 120.

Another embodiment uses a feature extractor block 110 that computes a feature representation via a linear combination of the magnitude or the phase component for each frequency bin of the frequency-domain representation of the audio signals, e.g., inter-microphone phase or magnitude differences. The computation of the input feature vector in this embodiment is similar to the computations in popular existing methods for narrowband DOA estimation (see [1]).

In an embodiment, phase differences are employed, e.g., as input for the DOA estimation block 120.

In some embodiments, the DOA estimation block 120 may, e.g., be an artificial neural network that comprises a connected series of different types of computation units or a collection of such units, called layers, for the functional mapping of the input features to the DOA for different frequency sub-bands.

The DOA estimation block 120 may, e.g., first compute a task-specific feature vector from the provided input, for example, by a non-linear combination of the frequency domain features corresponding to at least two microphones for each frequency bin of the frequency domain feature representation separately.

Following this, non-linear combinations of each element of the feature vectors may, e.g., be computed with different non-linear combination rules to utilize the cross-band information to further refine the computed features.

The computed feature vectors are then segmented into sub-bands where the number of sub-bands is less than or equal to the number of frequency bins in the frequency domain feature representation.

Finally, a DOA value is computed from each sub-band feature vector by a non-linear combination of the associated elements of the sub-band feature vectors where the combination rule is different for at least two sub-bands.

Figure 5:
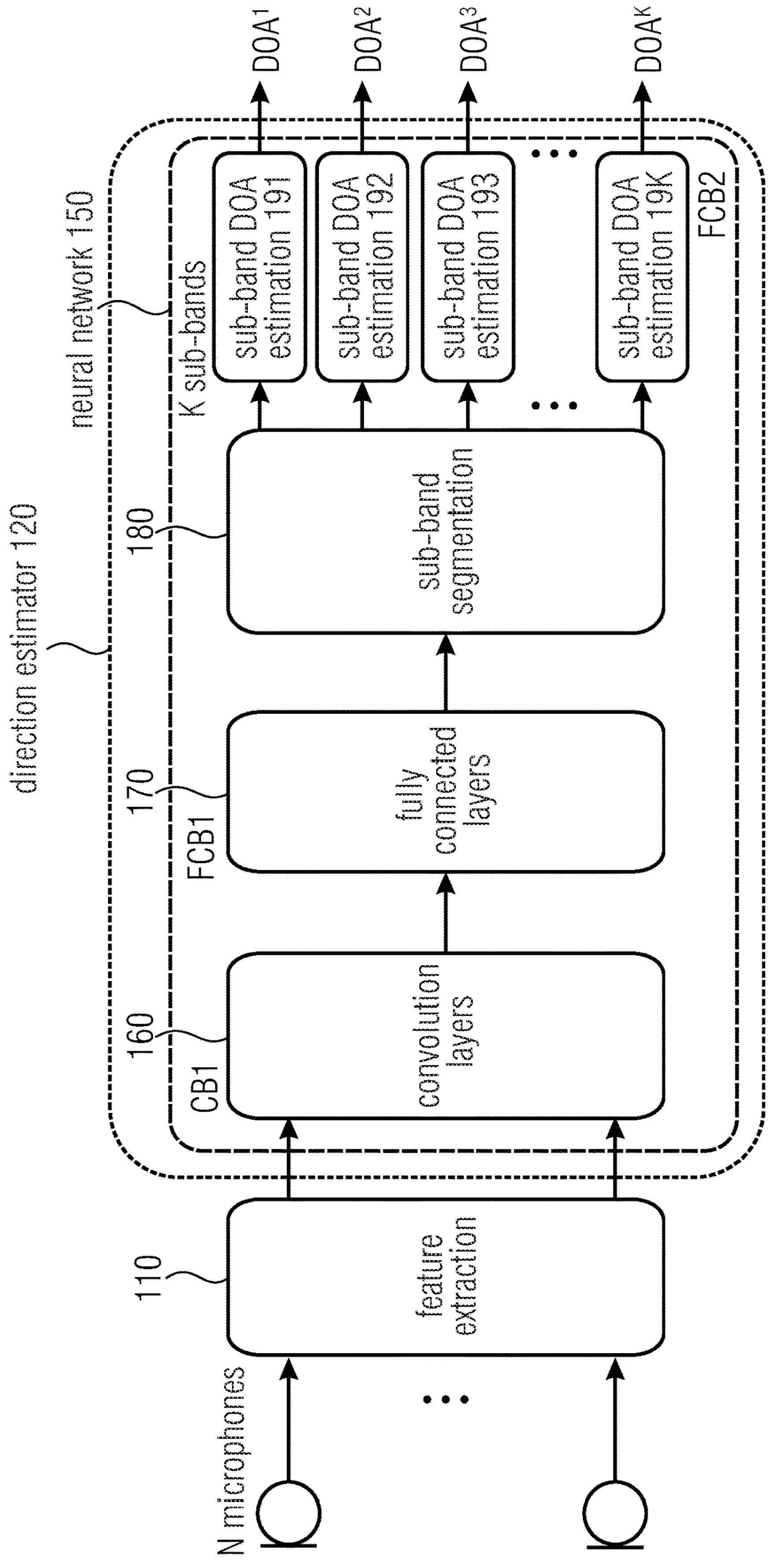
FIG. 5 illustrates an apparatus for estimating sub-band-specific direction information for two or more sub-bands of a plurality of sub-bands according to a further embodiment, in which a particular configuration of a neural network of the direction estimator is depicted.

FIG. 5 illustrates an apparatus for estimating sub-band-specific direction information for two or more sub-bands of a plurality of sub-bands according to a further embodiment, in which a particular configuration of a neural network of the direction estimator is depicted.

In FIG. 5, the different processing modules in the direction estimator 120, in FIG. 5, a DOA estimation block 120 are shown. In FIG. 5, the direction estimator 120 comprises a neural network 150.

Given the frequency domain feature vector for each microphone channel, the first module 160 in this block, CB1, typically comprises multiple convolution layers that compute a non-linear combination of the frequency domain features corresponding to at least two microphones for each frequency bin of the frequency domain feature representation separately. The output of the module CB1 160 may, e.g., be referred to as frequency-domain feature embedding vector. In an embodiment, only elements of the frequency domain feature vector that are associated with the same frequency bin are combined. In the case where N microphones (with N equal to or larger than two) are considered, the number of layers in this processing module is typically designed to be (N−1), similar to the design choice in [5]. This is based on the finding that to account for all the microphone pairs (two microphone combinations) for a given microphone array, (N−1) layers are used. This implies that the output of the first module CB1 of the DOA estimation block, represents aggregated information of the DOA related information from all microphone input channels for that particular frequency bin.

Following this, the next processing module FCB1 170 consists of at least one fully connected layer 170, that aid in the non-linear combination of cross-band features from different frequency bins such that information from frequency bins below the critical spatial aliasing frequency can be utilized to obtain unambiguous DOA estimation for frequency bins that lie above the critical frequency. The input of the module FCB1 are the frequency-domain feature embedding vector as obtained as the output from module CB1.

Then, the operation of sub-band segmentation is performed on the output of processing module FCB1 170. The sub-band segmentation can be performed based on some empirically determined task-specific scale or existing psychoacoustic scales such as equivalent rectangular bandwidth (ERB) [6] or Bark scale. The output of the segmentation module 180 is a set of K sub-band feature embedding vectors, where K is typically smaller or equal to the number of frequency bins, e.g., the number of elements of the frequency domain feature embeddings at the output of FCB1.

Once the segmentation is performed, the sub-band feature embedding vectors are then provided to the sub-band DOA estimation blocks 191, 192, 193, 19K that consist of at least one fully connected layer that computes a DOA estimate for each sub-band separately based on a non-linear combination of the feature embedding vector corresponding to that specific sub-band only. The non-linear combination rules are different for at least two of the sub-bands. Typically, the process of determining the DOA values for each sub-band is formulated as a classification task, e.g., to map each of the K sub-band feature embedding vectors to a corresponding class representing pre-defined DOA values or pre-defined ranges of DOA values for that specific sub-band. Alternatively, the process of determining the DOA values can also be formulated as a regression task, e.g., to map each of the K sub-band feature embedding vectors to a single DOA value for each sub-band.

In the following, further embodiments are described.

In an embodiment, multiple microphone input signals may, e.g., be received.

According to an embodiment, a frequency domain feature vector may, e.g., (then) be computed from the microphone input signals based on the phase or magnitude information only, or a concatenation of the amplitude and phase information or combining the phase or amplitude information of different microphone channels/signals. Or, only magnitude information of different microphone channels/signals may, e.g., be used.

In an embodiment, a frequency domain feature embedding vector may, e.g., (then) be computed by aggregating the information of the frequency domain feature vectors across the microphone input channels (typically by convolutional neural networks).

According to an embodiment, sub-band feature embedding vectors may, e.g., (then) be computed using a non-linear combination of the frequency domain embeddings across all frequencies and performing a subsequent sub-band segmentation. The number of sub-band vectors is typically smaller than the number of frequency bins.

In an embodiment, the desired DOA estimates may, e.g., (then) be computed for each sub-band by applying a fully connected ANN separately to each sub-band feature embedding vector. Typically, this task is formulated as a classification task to map the sub-band feature embedding vectors to a set of predefined DOA values or ranges of DOA values.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] J. Chen, J. Benesty, & Y. Huang, Time Delay Estimation in Room Acoustic Environments: An Overview. EURASIP Journal on Advances in Signal Processing, 2006, 1-19.

[2] V. V. Reddy, A. W. Khong, & B. Ng, Unambiguous Speech DOA Estimation Under Spatial Aliasing Conditions. IEEE/ACM Transactions on Audio, Speech, and Language Processing, 22, 2133-2145.

[3] O. Thiergart, W. Huang and E. A. P. Habets, "A low complexity weighted least squares narrowband DOA estimator for arbitrary array geometries," 2016 IEEE International Conference on Acoustics, Speech and Signal Processing (ICASSP), Shanghai, 2016, pp. 340-344, doi: 10.1109/ICASSP.2016.7471693.

[4] J. H. DiBiase, H. Silverman, & M. Brandstein, "Robust Localization in Reverberant Rooms". Microphone Arrays, 2001.

[5] S. Chakrabarty and E. A. P. Habets, "Multi-Speaker DOA Estimation Using Deep Convolutional Networks Trained With Noise Signals," in IEEE Journal of Selected Topics in Signal Processing, vol. 13, no. 1, pp. 8-21, March 2019, doi: 10.1109/JSTSP.2019.2901664.

[6] B. C. J. Moore and B. R. Glasberg, "Suggested formulae for calculating auditory-filter bandwidths and excitation patterns" Journal of the Acoustical Society of America 74: 750-753, 1983.

The invention claimed is:

1. An apparatus for estimating sub-band-specific direction information for two or more sub-bands of a plurality of sub-bands, wherein the apparatus comprises:

a feature extractor for calculating a feature vector comprising a plurality of feature samples for a plurality of frequency bands of two or more audio signals, and a direction estimator being configured to receive the plurality of feature samples and being configured to output a plurality of output samples wherein the output samples indicate, for each sub-band of the two or more sub-bands, the sub-band-specific direction information for said sub-band, wherein each of the plurality of sub-bands is equal to one of the plurality of frequency bands or comprises at least one frequency band or a portion of a frequency band of the plurality of frequency bands, wherein the apparatus is configured to employ the sub-band specific direction information for audio signal processing.

2. The apparatus according to claim 1, wherein the direction estimator is configured to employ a machine learning concept to determine, using the plurality of features samples, the plurality of output samples which indicate the sub-band-specific direction information for the two or more sub-bands.

3. The apparatus according to claim 1, wherein the direction estimator comprises a neural network, wherein the neural network is configured to receive as input values the plurality of feature samples, and wherein the neural network is configured to output the plurality of output samples which indicate, for each sub-band of the two or more sub-bands, the sub-band-specific direction information for said sub-band.

4. The apparatus according to claim 1, wherein the direction estimator is configured to determine the sub-band-specific direction information for said sub-band depending on one or more of the plurality of feature samples, which are associated with said sub-band, and depending on one or more further feature samples of the plurality of feature samples, which are associated with one or more other sub-bands of the plurality of sub-bands.

5. The apparatus according to claim 1, wherein the direction estimator is configured to determine the sub-band-specific direction information for each sub-band of the two or more sub-bands depending on at least one of the plurality of feature samples of each of the plurality of frequency bands of each of the two or more audio signals.

6. The apparatus according to claim 1, wherein the sub-band-specific direction information for each sub-band of the two or more sub-bands is direction-of-arrival information for said sub-band or depends on direction-of-arrival information for said sub-band.

7. The apparatus according to claim 6, wherein the direction of arrival information for said sub-band depends on a location of a real sound source or depends on a location of a virtual sound source.

8. The apparatus according to claim 1, wherein the plurality of feature samples for the plurality of frequency bands comprises a plurality of phase values and/or a plurality of amplitude or magnitude values of the two or more audio signals for the plurality of frequency bands, and/or wherein the plurality of feature samples for the plurality of frequency bands comprises a concatenation of a plurality of amplitude or magnitude values and of a plurality of phase values of the two or more audio signals for the plurality of frequency bands.

9. The apparatus according to claim 1, wherein the feature extractor is configured to acquire the plurality of feature samples for the plurality of frequency bands of two or more audio signals by transforming the two or more audio signals from a time domain to a frequency domain.

10. The apparatus according to on claim 3, wherein the direction estimator is configured to determine the sub-band-specific direction information for each sub-band of the two or more sub-bands by employing at least one fully connected layer of the neural network that connects at least one of the plurality of feature samples of each of the plurality of frequency bands of each of the two or more audio signals with each other.

11. The apparatus according to claim 3, wherein the direction estimator is configured to determine the sub-band-specific direction information for each sub-band of the two or more sub-bands by employing one or more convolution layers of the neural network that connect feature samples of the plurality of feature samples that are associated with different audio signals of the two or more audio signals.

12. The apparatus according to claim 3, wherein the neural network comprises a sub-band segmentation layer that provides as output of the sub-band segmentation layer one or more output values for each of the two or more sub-bands, wherein the input values of the sub-band segmentation layer depend on the plurality of feature samples for the plurality of frequency bands of two or more audio signals.

13. The apparatus according to claim 1, wherein a segmentation of the frequency spectrum into the plurality of sub-bands depends on a psychoacoustic scale.

14. The apparatus according to claim 12, wherein the neural network comprises two or more sub-band estimation blocks configured for estimating the sub-band-specific direction information for the two or more sub-bands, wherein for each sub-band of the two or more sub-bands, a sub-band estimation block of the two or more sub-band estimation blocks is configured to estimate the sub-band-specific direction information for said sub-band depending on two or more output values of the sub-band segmentation layer for said sub-band.

15. The apparatus according to claim 14, wherein for each sub-band of the two or more sub-bands, said sub-band estimation block of the two or more sub-band estimation blocks is configured to estimate the sub-band-specific direction information for said sub-band by conducting a non-linear combination of the two or more output values of the sub-band segmentation layer for said sub-band according to a non-linear combination rule for said sub-band, wherein the non-linear combination rules for at least two of the two or more sub-bands are different from each other.

16. The apparatus according to claim 1, wherein the two or more audio signals are two or more microphone signals or are derived from two or more microphone signals.

17. A method for estimating sub-band-specific direction information for two or more sub-bands of a plurality of sub-bands, wherein the method comprises:

calculating a feature vector comprising a plurality of feature samples for a plurality of frequency bands of two or more audio signals, and receiving the plurality of feature samples and being configured to output a plurality of output samples wherein the output samples indicate, for each sub-band of the two or more sub-bands, the sub-band-specific direction information for said sub-band, wherein each of the plurality of sub-bands is equal to one of the plurality of frequency bands or comprises at least one frequency band or a portion of a frequency band of the plurality of frequency bands, wherein the method further comprises employing the sub-band specific direction information for audio signal processing.

18. A non-transitory digital storage medium having stored thereon a computer program for performing a method for estimating sub-band-specific direction information for two or more sub-bands of a plurality of sub-bands, the method comprising:

calculating a feature vector comprising a plurality of feature samples for a plurality of frequency bands of two or more audio signals, and receiving the plurality of feature samples and being configured to output a plurality of output samples wherein the output samples indicate, for each sub-band of the two or more sub-bands, the sub-band-specific direction information for said sub-band, wherein each of the plurality of sub-bands is equal to one of the plurality of frequency bands or comprises at least one frequency band or a portion of a frequency band of the plurality of frequency bands, wherein the method further comprises employing the sub-band specific direction information for audio signal processing, when the computer program is run by a computer.

* * * * *